Jan. 27, 1948. G. L. BUC ET AL 2,435,175
FLICKERING BEAM SPECTROPHOTOMETERS FOR THE MEASUREMENT OF BRONZE
Filed Aug. 8, 1946 2 Sheets-Sheet 1
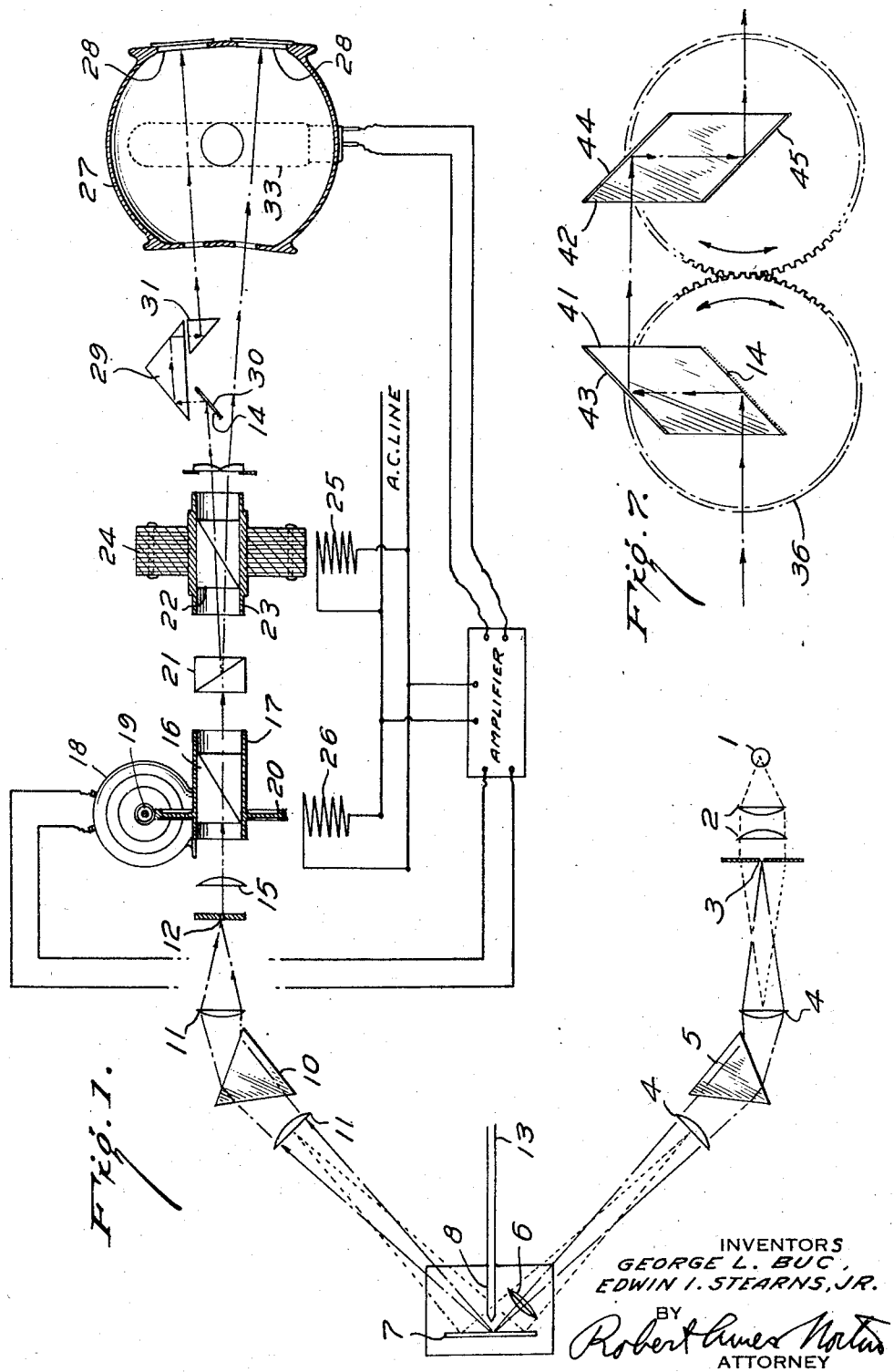
INVENTORS
GEORGE L. BUC,
EDWIN I. STEARNS, JR.
BY
Robert Ames Norton
ATTORNEY

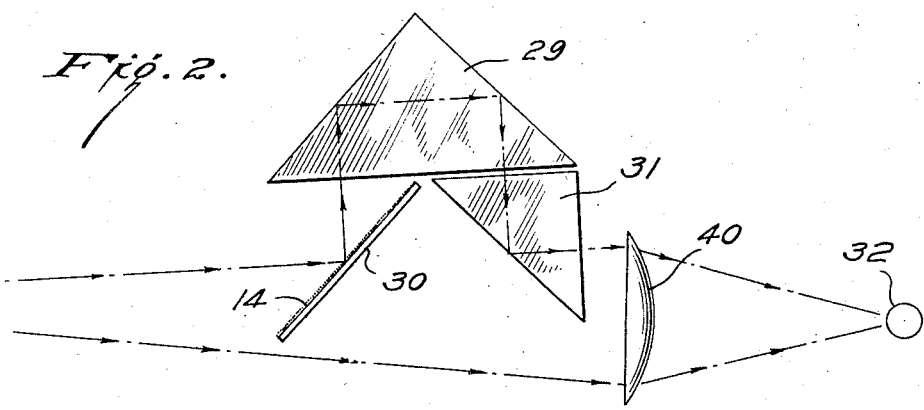
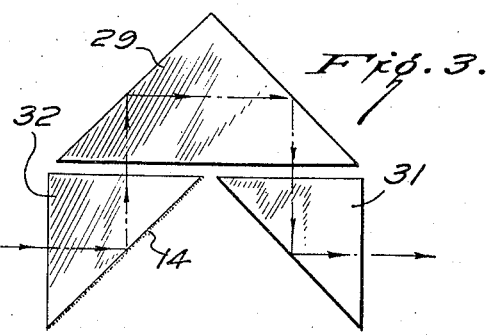
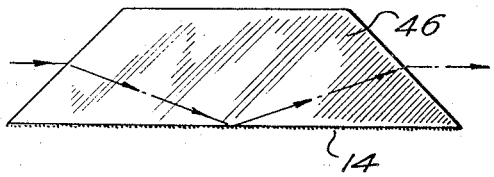
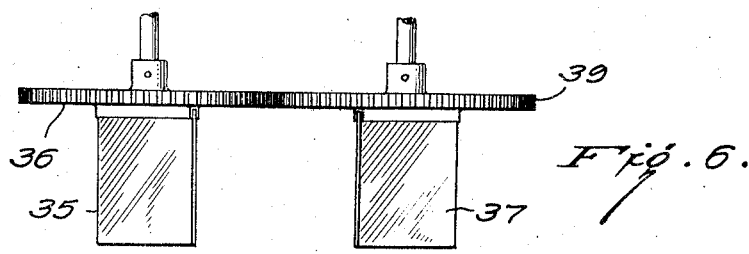
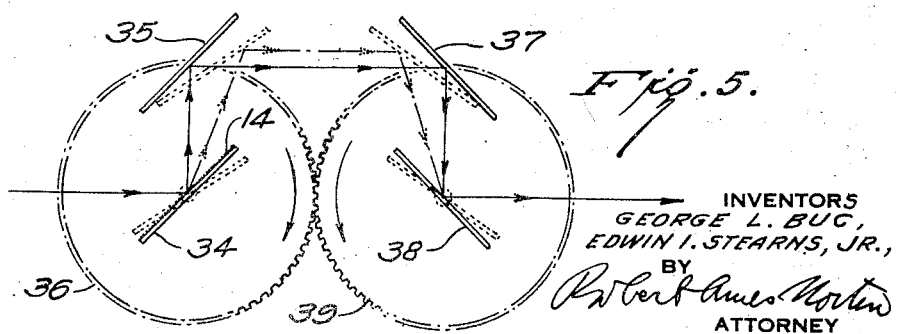

Patented Jan. 27, 1948

2,435,175

UNITED STATES PATENT OFFICE 2,435,175

FLICKERING BEAM SPECTROPHOTOMETER FOR THE MEASUREMENT OF BRONZE

George L. Buc, Orange, and Edwin I. Stearns, Jr., North Plainfield, N. J., assignors to American Cyanamid Company, New York, N. Y., a corporation of Maine Application August 8, 1946, Serial No. 689,144

7 Claims. (Cl. 250—41.5)

This invention relates to flickering beam spectrophotometers capable of measuring bronze and to attachments therefor.

Flickering beam spectrophotometers, particularly those using polarization photometering, have achieved extended use because of their speed and accuracy. However, these instruments, when used for reflection measurements, are only capable of measuring total reflectance both of the body color of a colored object and the surface. The phenomenon of bronze in pigments, inks, and the like is one of chromatic surface reflectance at various angles. Such measurements cannot be made in the ordinary flickering beam spectrophotometer and this field of measurement, therefore, has been closed to flickering beam spectrophotometers and has necessitated the use of less efficient measurements. The pigment and ink manufacturer, however, is much concerned with bronze of various pigments, such as for example, alkali blue, because inks and surfaces colored therewith are often viewed at an angle at which the surface reflection is an important factor.

The bronze effect may be divided into two general types, interface and interference bronzes. Interference bronze occurs normally at an air-ink or pigment surface. Bronzing in such a case will usually vary widely in color with the angle of observation. The interface type of bronze can also be noted where an ink is mounted on a transparent surface such as glass and the ink-glass interface is observed for surface reflection. In this case there is often but little change in color with the angle of observation.

The ordinary flickering beam spectorphotometer may be considered as a device which produces two separate beams which flicker from maximum to minimum in opposite phase. One beam strikes a reflectance sample and the other a reflectance standard suitably mounted on the inside of an integrating sphere which is provided with a photoelectric device, and photometering is effected by varying the intensity of the more strongly reflected beam until a balance of the total light in the integrating sphere is re-established. Photometering is effected in many ways, such as by mechanical change in the area of the beams and in the more successful instruments in practical use today by a polarizing prism. The reflectance is a diffuse one and no measurement of bronze is possible as the integrating sphere receives the total reflected light, both that of the body color itself and the light reflected from the surface.

According to the present invention an air pigment or glass pigment surface is inserted or mounted in one of the beams at an angle. The reflectance due to surface bronze is reflected at the specular reflectance angle. The body color, which is a diffuse reflection, does not follow the same path. A simple inclined air pigment or glass pigment surface cannot be used in an ordinary spectrophotometer because the portion of the beam of light reflected as bronze is deviated and no longer enters the integrating sphere or strikes the integrating device through the predetermined openings. The present invention depends on a modification of a flickering beam spectrophotometer whereby an inclined air-ink glass-ink surface is interposed in the sample beam and the specularly reflected light is turned so as to resume the same course as the original beam. The beam from the bronze surface reflection then enters the integrating sphere or other integrating device and the spectrophotometer measures the color of the bronze.

The method of reflecting light from the ink-air or ink-glass surface and redirecting the reflected light to a path coincident with the original beam path may utilize various organizations of optical elements. There are two general methods which are preferred. One is to use three reflections to redirect the specularly reflected light. The other method involves the use of a Dove prism or similar instrument in which the original beam is first refracted to strike an ink-glass interface and the reflected beam then redirected by a second refraction to coincide with the path of the original beam. Other methods may be employed without departing from the broader aspects of the invention.

Because of the relatively slight change in color of interface bronze with varying angle of incident light, it is usually sufficient to measure bronze from such an interface at a single angle. This makes possible very compact optical elements. For comparatively high angles of incidence Dove prisms offer the maximum of simplicity and are preferred. For smaller angles of incidence, for example, 45°, a combination of two right angled prisms with a Porro prism forms a compact unit which can be readily inserted in the sample beam of existing spectrophotometers.

Where it is desired to measure bronze over a wide range of angles of incidence, as is desirable in the measuring of interference bronze, two pairs of parallel mirrors may be used mounted on meshing gears, one mirror of each pair being mounted on the axis of its gear and the other at the periphery. It is an advantage of the invention, particularly where compact units such as a Dove prism or units using a Porro prism are involved, that ready interchangeability is possible in existing spectrophotometers. The additional optical assembly can be inserted into the sample beam or removed at will. It is thus not necessary to construct a flickering beam instrument which is to be used only for bronze measurements. Where it is desired to have the 100% reflection point coincide with the same point when the instrument is used without the modification of the present invention, this may be effected by introducing a duplicate of the optical elements used for bronze measurements into the other or standard beam. The reflecting surface, of course, which is intended to reflect 100% must be a mirror. This is not shown on the drawings as the elements are otherwise exact duplicates. Introduction of elements which duplicate the reflection path of the bronze measurement does not increase either the accuracy or sensitivity of the instrument in any way. It is merely convenient where spectrophotometric records are made on printed forms in which the 100% line is that of an instrument used for ordinary reflection measurements.

The invention will be described in greater detail in conjunction with the drawings, in which:

Fig. 1 is a diagrammatic section of a flickering beam spectrophotometer utilizing a Porro prism for air-ink surface measurements;

Fig. 2 is a diagrammatic section of the integrating portion of a beam recombining flickering beam spectrophotometer;

Fig. 3 is a detailed view of a Porro prism and two right angled prisms for ink-glass interface bronze measurements;

Fig. 4 is a section through a Dove prism for ink-glass interface bronze measurements;

Fig. 5 is an elevation of a modification using two pairs of mirrors on meshing gears;

Fig. 6 is a plan view of the modification of Fig. 5; and

Fig. 7 is an elevation of a modification similar to Fig. 5 for measuring ink-glass interface bronze.

In Fig. 1 the monochromator consists of an incandescent lamp 1, preferably of the low voltage compact filament type, a pair of condensing lenses 2, a variable slit 3, collimating lenses 4, first prism 5, lens 6, mirror 7, knife edge 8, second prism 10, collimating lenses 11 and exit slit 12. The mirror and knife edge may be reciprocated by means of the rod 13 moving the slit defined by the knife edge through the spectrum so that the light passing slit 12 can be caused to traverse the visible spectrum.

The light leaving the slit 12 of the monochromator is focused by lens 15 into the photometric prism 16 which is of a conventional Nichol or Rochon type. The prism is mounted in the hollow shaft 17 which is rotated by the motor 18 through the worm 19 and ring gear 20. The plane polarized beam leaves the photometric prism and passes through a Wollaston prism 21 where it is separated into two beams plane polarized at right angles to each other and the two beams pass through a flicker prism 22 which is mounted in a hollow shaft 23 being the center of the rotor 24 of a synchronous motor, the field 25 of which is energized by 60 cycle alternating current which is also used to energize the field 26 of the motor 18. After passing through the flicker prism and decentering lenses 9, one beam enters an integrating sphere 27, striking a target 28, which may be the usual magnesium carbonate block smoked with magnesium oxide. The other zeam strikes an inclined surface 30 covered with a layer of ink 14 containing the pigment, the bronze of which is to be measured. As illustrated the angle of incidence is 45°. The specularly reflected light then enters a Porro prism 29, is reflected twice, and finally passes into a right angled reflecting prism 31 from which it emerges in a path which is a continuation of that of the original beam. The path then enters the integrating sphere 27 striking another magnesium carbonate block target 28.

The remainder of the spectrophotometer operates in the conventional manner, that is to say, if the flickering beams are equal in intensity there is no fluctuation of total light in the integrating sphere at flicker frequency. If one of the beams is stronger the light will pulsate in phase with the stronger beam and the phototube 33, which receives integrated light through an opening in the integrating sphere, will transform these flicker frequency fluctuations into electric current which enters the input of the high gain amplifier 34. The flicker frequency ouput of the amplifier is led to the motor 18, the phase being so adjusted that the motor drives the photometering prism 16 in a direction to reduce the intensity of the stronger beam and increase the intensity of the other beam until a balance is achieved in the integrating sphere. The amount of movement of the prism 16 can be used to measure the ratio of the intensity of the two beams.

Fig. 2 shows a portion of the optics of a modified form of spectrophotometer in which the two flickering beams are recombined by a lens 40 so as to strike the phototube 33 instead of using an integrating sphere. The ink holder, Porro and right angles prisms are arranged in the same manner as in Fig. 1 and bear the same reference numerals. This modification of the spectrophotometer has the advantage that it is more sensitive because the great loss in efficiency of light integrated at an integrating sphere does not take place. On the other hand, when bronze is not being measured this type of spectrophotometer is not suitable for ordinary reflectance measurements, and therefore in an instrument in which the prism assembly is removably mounted the modification using an integrating sphere is more versatile.

Fig. 3 illustrates a prism assembly similar to that of Figs. 1 and 2 but designed to measure the bronze and a glass-ink interface. Like parts bear like numerals. Instead of a glass plate on which the ink is placed there is provided a right angled prism 32, the ink layer 14 being applied to the hypotenuse of the right angle. The light path and operation are otherwise identical with that shown in Figs. 1 and 2.

Fig. 4 shows a Dove prism 46 which takes the place of the Porro prism and the two right angled prisms in Fig. 3. The ink layer 14 is on the base of the Dove prism and redirection of the light path is effected by two refractions rather than three reflections. This type of assembly is useful primarily for the measurements of relatively high angles of incidence.

Figs. 5 and 6 illustrate a device which is useful for measuring bronze at various angles of incidence. The ink surface 14 is applied to a holder 34 mounted on the axis of a gear 35, Specularly reflected light strikes the mirror 35 which is parallel to the surface 34 and mounted at the periphery of the gear. From this mirror the light is then reflected to a mirror 37 mounted on the periphery of the gear 39 and meshing with the gear 36, and is then rflected to a third mirror 38 parallel to the mirror 37 and mounted on the axis of the gear 39. The light path is then a prolongation of that striking the ink surface 14. Different angles of incidence may be obtained by rotating the gears. The position for a 45° angle of incidence is shown in full lines and larger angles of incidence in dotted lines.

Fig. 7 illustrates a device operating in a manner somewhat similar to that of Figs. 5 and 6 but measuring ink-glass interface bronze at various angles of incidence. Like elements bear the same reference numerals. Instead of four mirrors being mounted on the two meshing gears 36 and 39 two transparent parallelopipeds 41 and 42 are mounted. The lower surface of the first parallelopiped 41, which constitutes a plane containing the axis of the gear 36, is adapted to receive an ink coating. Specularly reflected light passes up through the transparent body and is reflected by the silvered surface 43 in the same manner as the specularly reflected light from the air-ink interface in Figs. 5 and 6 is reflected by the mirror 35. The upper and lower surfaces 44 and 45 of the second parallelopiped 42 are likewise silvered and reflect and redirect the light precisely as do the mirrors 37 and 38 in Figs. 5 and 6. Different angles of incidence for glass-ink interface may be obtained by rotation of the meshing gears in the same manner as is described in connection with Figs. 5 and 6.

Fig. 7 illustrates a typical setup permitting the measurement of glass-ink interface bronze at various angles of incidence. The use of two parallelopipeds mounted on gears presents numerous advantages and is preferred. Any other mountings which permit variation of angle of incidence without displacement of the final beam may be employed, such as for example, a pair of pentaprisms associated with a Porro prism.

We claim:

1. In a flickering beam spectrophotometer comprising a monochromator, a photometering element, a beam splitter, means for causing the two beams to flicker in opposite phases, means for integrating the light from the two beams, photoelectric means responsive to fluctuations in said integrated light at flicker frequency, said photoelectric means constituting the input to a high gain vacuum tube amplifier, and driving means for the photometering element actuated by the amplified flicker frequency output of the amplifier, the improvement which comprises means in one of the flickering beams, including a surface adapted to be coated with a coating, the bronze of which is to be measured, and capable of causing light from the flickering beam to strike said surface at an angle and means for redirecting specularly reflected light from said surface into the integrating means.

2. In a flickering beam spectrophotometer comprising a monochromator, a photometering element, a beam splitter, means for causing the two beams to flicker in opposite phases, means for integrating the light from the two beams, photoelectric means responsive to fluctuations in said integrated light at flicker frequency, said photoelectric means constituting the input to a high gain vacuum tube amplifier, and driving means for the photometering element actuated by the amplified flicker frequency output of the amplifier, the improvement which comprises an inclined surface in one of said beams adapted to receive a coating, the bronze of which is to be measured, and three reflecting means in series positioned to redirect specularly reflected light from said coating into the integrating means in the form of a prolongation of the original flickering beam.

3. In a flickering beam spectrophotometer comprising a monochromator, a photometering element, a beam splitter, means for causing the two beams to flicker in opposite phases, means for integrating the light from the two beams, photoelectric means responsive to fluctuations in said integrated light at flicker frequency, said photoelectric means constituting the input to a high gain vacuum tube amplifier, and driving means for the photometering element actuated by the amplified flicker frequency output of the amplifier, the improvement which comprises an inclined, transparent element in one of said flickering beams having a surface struck by the beam passing through the transparent element and adapted to receive a coating, the bronze of which is to be measured, and at least three reflecting means in series capable of redirecting specularly reflected light from said surface into the integrating means in the form of a prolongation of the original flickering beam.

4. In a flickering beam spectrophotometer comprising a monochromator, a photometering element, a beam splitter, means for causing the two beams to flicker in opposite phases, means for integrating the light from the two beams, photoelectric means responsive to fluctuations in said integrated light at flicker frequency, said photoelectric means constituting the input to a high gain vacuum tube amplifier, and driving means for the photometering element actuated by the amplified flicker frequency output of the amplifier, the improvement which comprises a Dove prism interposed in one of the flickering beams, the base of the prism being adapted to receive a coating, the bronze of which is to be measured, the prism being so located that light from the flickering beam is refracted to strike the base surface at an angle and the specularly reflected light therefrom is redirected by refraction from a second inclined surface of the prism into the integrating means in the form of a prolongation of the original flickering beam.

5. A spectrophotometer according to claim 2 in which there is provided a Porro prism and a reflecting prism in series, the specularly reflected light from the surface entering the Porro prism being twice reflected therein and finally being redirected into the integrating sphere as a prolongation of the original flickering beam by the reflecting prism.

6. A spectrophotometer according to claim 2 in which the surface is mounted on and normal to the axis of one of a pair of meshing gears of equal radius, a reflecting surface is mounted parallel to said first surface at the periphery of one gear and a pair of parallel reflecting surfaces are mounted on the second gear, one at the periphery and one at and normal to the axis thereof, the position of said surface being such that specularly reflected light from the first surface is reflected from the three reflecting surfaces to form a beam constituting a prolongation of the original flickering beam striking the first surface, and means are provided for rotating the gears through an angle to permit specular reflection at a series of angles of incidence.

7. A spectrophotometer according to claim 3 in which two transparent parallelopipeds are mounted on a pair of meshing gears of equal radius, one surface of each parallelopiped constituting a plane parallel to the axis of its respective gear, the coaxial surface of the first parallelopiped being adapted to receive a coating, the bronze of which is to be measured, and the other being a reflecting surface, the other two parallel surfaces of the parallelopipeds being likewise reflecting, and the device being adjusted and mounted in the spectrophotometer so that one flickering beam enters the first parallelopiped striking the lower surface thereof at an angle, and specularly reflected light from the coating thereof being successively reflected by the three reflecting surfaces of the parallelopipeds to be directed into the integrating means in the form of a beam constituting a prolongation of the original flickering beam.

GEORGE L. BUC.
EDWIN I. STEARNS, Jr.